June 7, 1960 E. F. HUDDLE 2,939,301
WARNING DEVICE
Filed March 9, 1959 2 Sheets-Sheet 1
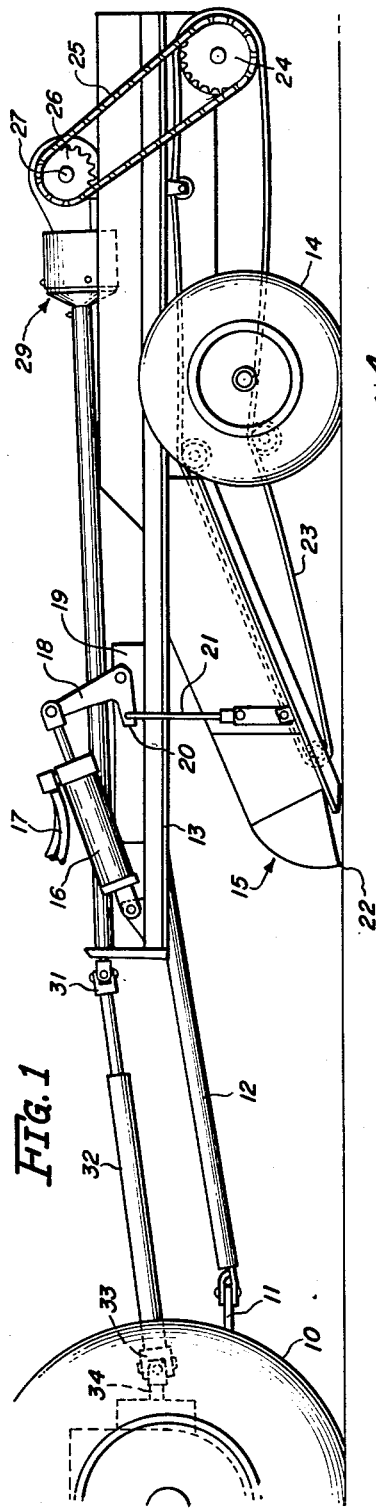
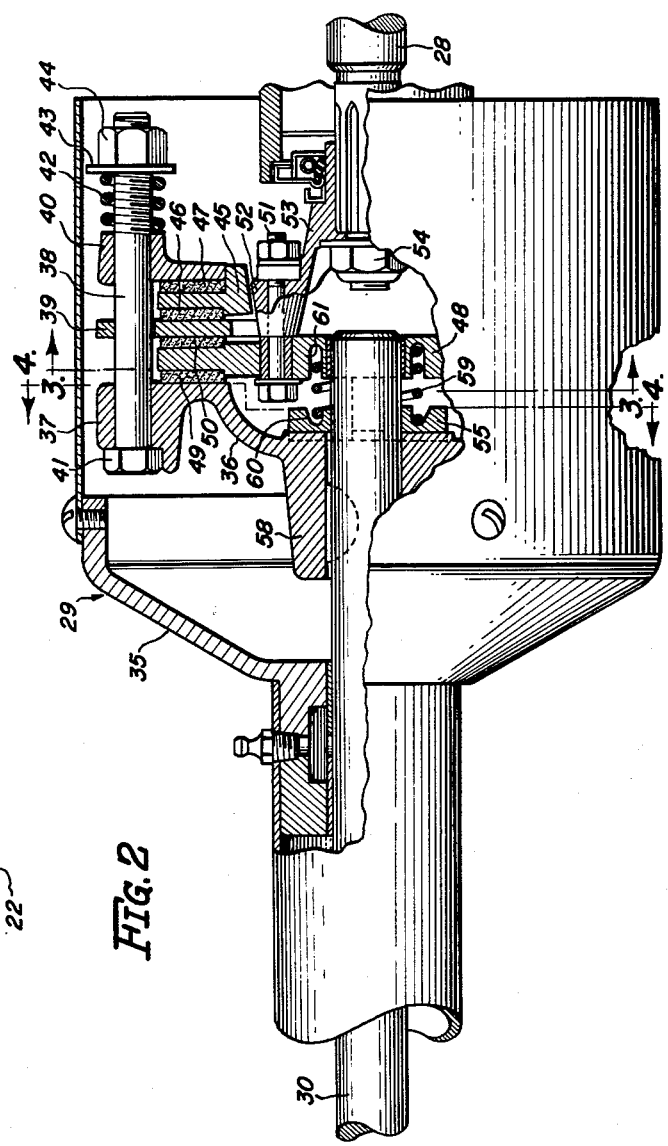
INVENTOR
Edwin F. Huddle
ATTORNEY June 7, 1960 — E. F. HUDDLE — 2,939,301
WARNING DEVICE Filed March 9, 1959 — 2 Sheets-Sheet 2

INVENTOR
Edwin F. Huddle
Paul O. Pippel
ATTORNEY

United States Patent Office 2,939,301
Patented June 7, 1960

2,939,301

WARNING DEVICE

Edwin F. Huddle, Elmwood Park, Ill., assignor to International Harvester Company, Chicago, Ill., a corporation of New Jersey Filed Mar. 9, 1959, Ser. No. 798,159

7 Claims. (Cl. 64—30)

This invention relates to agricultural implements and particularly to an implement having a driven part. More specifically the invention concerns a friction or torque clutch and signaling means warning of interference with driving of the driven part.

The invention is described and shown in its application to a potato digger having an endless conveyor driven from the power take-off of a tractor and adapted to receive dug potatoes, shake them, and convey them to a point of discharge. In the digging of potatoes, rocks and clods of hard earth frequently foul the chains of the endless conveyor and a friction type clutch is provided in the drive transmission means to avoid damage to the driving apparatus. However, the operator of the tractor propelling the machine is usually unaware of the slippage of the clutch plates and failure of the driving apparatus, and an object of the present invention is the provision of a novel warning or signaling device for use in conjunction with the type of clutch referred to herein.

Another object of the invention is the provision of a signaling device which is actuated by slippage between the faces of a friction clutch to set up a clattering noise and serve as a warning for the operator of the propelling vehicle that power is no longer being transmitted from the power source to the driven part.

Another object of the invention is the provision, in a friction clutch or the like, of a member having no driving function, rotatable with one of the drive transmitting elements but axially reciprocable at a rapid rate with respect to the driving and driven elements of the clutch upon slippage therebetween.

Other objects and advantages of the invention will become clear from the following detailed description when read in conjunction with the accompanying drawings wherein:

Figure 1 is a partial view in side elevation of a potato digger connected in draft-receiving relation to a tractor and having a driving connection to the power take-off shaft thereof;

Figure 2 is an enlarged, partial sectional view of a portion of the drive transmission mechanism for operating the conveyor chains of a potato digger and showing some details of construction of the drive clutch;

Figure 3:
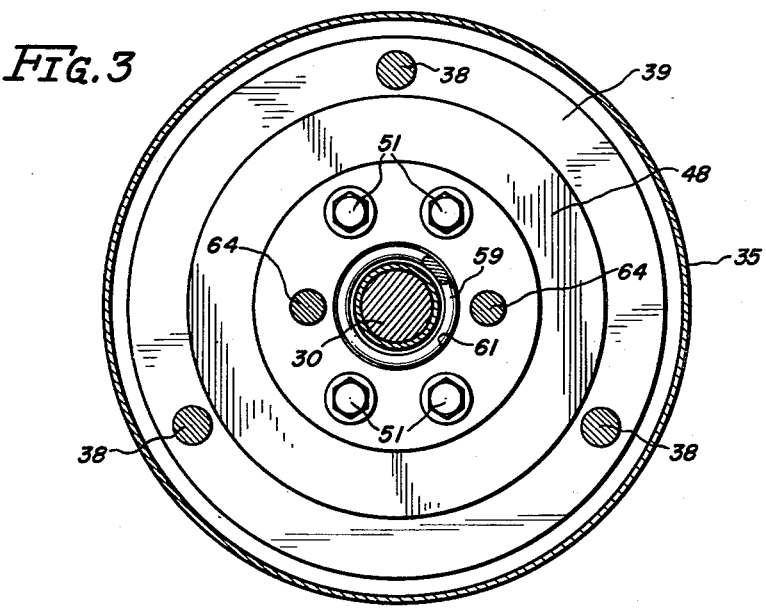
Figure 3 is a section taken on the line 3—3 of Figure 2.

In the drawings numeral 10 designates one of the drive wheels of a tractor having a drawbar 11 to which is connected the hitch frame 12 of a potato digger which, for the purposes of this invention, may be regarded as generally of conventional construction including a frame 13 supported by wheels 14 and carrying a digging subframe 15 pivoted on the main frame 13 for vertical movement.

Digger frame 15 is raised and lowered by the provision of a hydraulic ram 16 receiving fluid under pressure from a power source on the tractor through hose lines 17. Ram 16 is anchored at one end to the main frame 13 and is connected at its other end to one arm 18 of a bellcrank pivotally mounted on a bracket 19 secured to the frame 13, the other arm 20 of the bellcrank being connected by a lifting link 21 with the digger frame 15.

A digging blade 22 at the front end of the frame 15 is adapted to penetrate the soil, lift the potatoes and deliver them to a conveyor 23 driven by a sprocket wheel 24 connected by a chain 25 with another sprocket wheel 26 mounted on a transverse shaft 27 carried by the frame 13 and connected by any suitable means, not shown, to a driven shaft 28 extending longitudinally of the implement.

Shaft 28 is driven through a clutch 29 from a drive shaft 30 extending forwardly and connected by a universal joint 31 with a telescoping shaft 32 which is, in turn, connected by a universal joint 33 to the power take-off shaft 34 of the tractor.

Torque developed by shaft 30 is transmitted to shaft 28 by clutch 29 including a housing 35 enclosing the clutch cap or driving element 36 keyed to shaft 30.

Peripherally spaced on the clutch cap 36 are a plurality of bosses 37, each of which has a bore to receive a bolt 38 extending through registering apertures in spaced plates 39 and 40. Each bolt has a head 41 engaging the boss 37, and a coil spring 42, surrounding the end of the bolt, engages the plate 40 and a washer 43 adjustably held in position to vary the tension on spring 42, by a nut 44.

Driving element 36 and plates 39 and 40 rotate as a unit with the drive shaft 30. Plates 39 and 40 are urged toward the clutch cap 36 by springs 42, and these two plates are separated by a clutch disk 45 having on opposite sides thereof clutch facings 46 and 47 engaging the plates 39 and 40, respectively.

The driven element of the clutch comprises a disk or plate 48 having annular clutch facings 49 and 50 on opposite sides thereof engaging the driving element 36 and plate 39, respectively. Driven element 48 is bored to rotatably receive the end of shaft 30 and has a plurality of openings therein spaced circumferentially about the central bore therein to receive bolts 51 registering with openings in projecting bosses 52 on a connector 53, forming part of the driven element 48 and splined to the end of driven shaft 28. Member 53 is secured to shaft 28 by a nut 54 on the threaded end of the shaft. Driven element 48 is held in driving engagement with driving element 36 by the tension on springs 42, which are yieldable to permit the member 48 to slip relative to element 36 when the driven shaft 28 is slowed or stopped by fouling of the conveyor 23. In order to signal the tractor operator when such slow-down or stoppage occurs, resulting in slippage between the driving and driven elements 36 and 48, a small chattering plate 55 is provided and centrally bored to slidably and rotatably receive the shaft 30.

Plate 55 has beveled edge grooves 56 engageable with beveled projections 57 integral with the clutch cap or driving element 36 on the inner face of the hub 58 thereof. By virtue of the grooves 56 and projections 57, member 55 rotates with the driving element 36, being yieldably held in driving engagement therewith by a spring 59 surrounding shaft 30 and received in a groove 60 in member 55. The other end of spring 59 engages member 48 and is received in a recess 61 therein.

Figure 4:
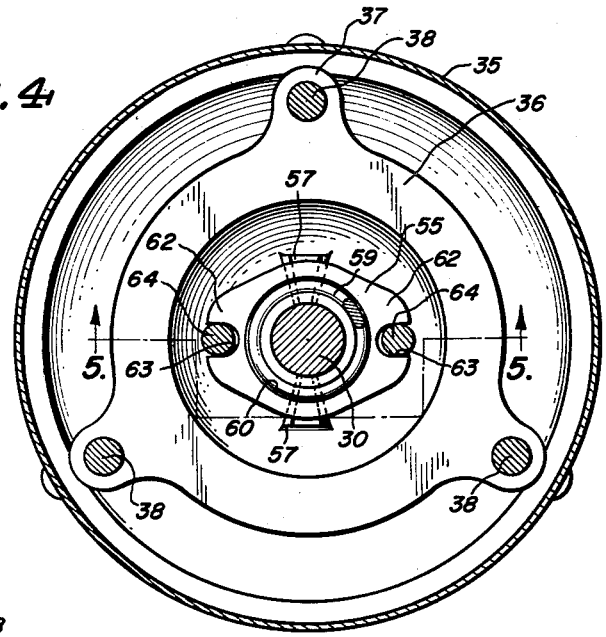
Figure 4 is a section taken on the line 4—4 of Figure 2.
Figure 5:
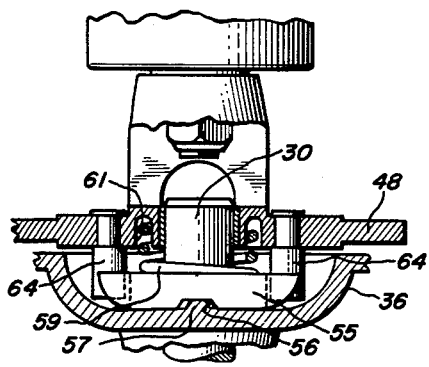
Figure 5 is a section taken on the line 5—5 of Figure 4.

As shown clearly in Figures 4 and 5, opposite projections 62 of member 55 are provided with recesses 63 to receive pins 64 secured to and projecting from member 48. Thus member 55 rotates with driving element 36 and driven element 48.

By virtue of the pin and the recess connections 64, 63 of member 55 with driven element 48, these parts always revolve together, although plate 55 is axially slidable on drive shaft 30 relative to the driven element 48. When operating conditions are encountered which clog the conveyor 23 causing slow-down or stoppage of drive chain 25 and driven shaft 28, drive shaft 30 continues to revolve and with it driving element 36, along with plates 39 and 40. The beveled projections 57 slide out of the grooves 56 forcing member 55 axially toward driven element 48 against the tension in spring 59, causing rapid reciprocation of the warning or signaling member 55, the striking of member 55 against the inner face of hub 58 making a clattering noise which is heard by the tractor operator, making him aware of the slippage occurring in the clutch 29 so that he can remove the obstacles to normal functioning of the conveyor 23.

It is believed that the function and operation of the warning device of this invention will be clearly understood from the foregoing description. It should likewise be understood, however, that the invention has been described in its preferred embodiment, and that modifications may be made in the invention without departing from the spirit thereof or the scope of the appended claims.

What is claimed is:

1. In a friction clutch, a rotatable driving element, a rotatable driven element frictionally driven thereby, yieldable means holding the driven element in driving engagement with the driving element and yieldable to accommodate slippage therebetween, and a noise making warning device responsive to slippage between said elements comprising an independent member disposed between the driving and driven elements, means forming a driving connection between one of said elements and said member for rotating the latter therewith while accommodating reciprocation of the member therebetween, and a second yieldable means holding said member in driving engagement with said other element, said last mentioned means being yieldable upon slippage of said one of said elements relative to said other element to accommodate rapid reciprocation of said member, causing the member to repeatedly strike said one of said elements and make a clattering noise.

2. In a friction clutch, a rotatable driving element, a rotatable driven element frictionally driven thereby, yieldable means holding the driven element in driving engagement with the driving element and yieldable to accommodate slippage therebetween, and a noise making warning device responsive to slippage between said elements comprising an independent member disposed between the driving and driven elements, means forming a driving connection between one of said elements and said member for rotating the latter therewith while accommodating relative axial movement therebetween, means forming a releasable driving connection between said member and said other element, and a second yieldable means biasing said member into driving engagement with said other element, said member being rapidly axially movable against the bias of said second yieldable means, upon slippage of said one of said elements relative to said other element, into and out of driving engagement with said other element.

3. The invention set forth in claim 2, wherein the driving connection between said member and said other element includes a projection on said other element and a notch in said member, said projection being movable into and out of said notch in response to rotation of said other element relative to said member and cause said member to strike said other element.

4. In drive transmission apparatus including a drive shaft and a driven shaft, means connecting said shafts comprising a first rotatable clutch element mounted on the drive shaft, a second rotatable clutch element mounted on the driven shaft and operatively engageable with said first clutch element to be driven thereby, said first element being adapted to rotate relative to the second element when the latter is stopped, a noise making member disposed between said elements and coaxially shiftable relative thereto, means forming a connection between said member and one of said elements for rotation therewith, spring means between said last mentioned element and said member for biasing the latter into engagement with the other of said elements, and a driving connection between said member and the other of said elements including means adapted to shift said member axially away from said other element against the bias of said spring means upon stoppage of said driven shaft and allow it to return and strike said other element.

5. In drive transmission apparatus including a drive shaft and a driven shaft, means connecting said shafts comprising a first rotatable clutch element mounted on the drive shaft, a second rotatable clutch element mounted on the driven shaft and operatively engageable with said first clutch element to be driven thereby, said first element being adapted to rotate relative to the second element when the latter is stopped, and a signaling device actuated by a reduction in speed of the driven shaft relative to the drive shaft, comprising a member mounted coaxially between said elements and connected to one of said elements for rotation therewith, spring means biasing the member into engagement with the other of said elements, and means acting between said other element and said member operative upon reduction of speed of said driven shaft relative to said drive shaft to shift said member axially away from and toward said other element, causing the member to sharply strike said other element at least once for each revolution of the drive shaft relative to the driven shaft.

6. In an implement having a constantly rotatable drive shaft, a driven shaft and a tool driven thereby, the combination of a torque clutch between said drive and driven shafts including a clutch element secured to the drive shaft, a clutch element secured to the driven shaft, means holding said elements in driving relation, said means being yieldable when an obstruction is encountered by the tool causing a reduction in speed of the driven shaft relative to the drive shaft, and a signaling device comprising a member mounted on one of said clutch elements for rotation therewith and axially shiftable relative thereto, spring means engaging said one of said elements and said member and biasing the latter into engagement with the other of said elements, and means serving as cam means on said other of said elements operable when the speed of rotation of said drive shaft exceeds that of the driven shaft to cause rapid reciprocation of said member into and out of engagement with said other element.

7. In an implement having a constantly rotatable drive shaft, a driven shaft and a tool driven thereby, the combination of a torque clutch between said drive and driven shafts including a clutch element secured to the drive shaft, a clutch element secured to the driven shaft, means holding said elements in driving relation, said means being yieldable when an obstruction is encountered by the tool causing a reduction in speed of the driven shaft relative to the drive shaft, and a signaling device comprising a member mounted on one of said clutch elements for rotation therewith and axially shiftable relative thereto, spring means engaging said one of said elements and said member and biasing the latter into engagement with the other of said elements, a tooth on said other of said elements and a recess on said member to receive said tooth, said tooth being adapted, when the speed of the drive shaft exceeds that of the driven shaft, to rapidly shift said member axially away from said other of said elements against the action of said spring means, causing said member to return and sharply strike said other element.

References Cited in the file of this patent

UNITED STATES PATENTS

| | | |
|---|---|---|
| 1,596,132 | Waite | Aug. 17, 1926 |
| 2,597,514 | Nash | May 20, 1952 |

FOREIGN PATENTS

| | | |
|---|---|---|
| 25,653 | Netherlands | Dec. 15, 1931 |